United States Patent

[11] 3,604,336

| [72] | Inventors | Donald E. Straub<br>St. Louis;<br>Henry F. Reitz, St. Louis; Albert A. Yanko, St. Louis; George B. Hoffmann, Lemay, all of, Mo. |
|---|---|---|
| [21] | Appl. No. | 762,277 |
| [22] | Filed | Sept. 16, 1968 |
| [45] | Patented | Sept. 14, 1971 |
| [73] | Assignee | Schrybs Investment Company, Incorporated<br>St. Louis, Mo. |

[54] COOKING DEVICE AND THE LIKE
14 Claims, 9 Drawing Figs.

[52] U.S. Cl. ........................................... 99/327,
99/107, 99/332, 99/335, 99/339, 99/386, 99/390,
99/391, 99/392, 99/393, 99/443, 126/41, 198/135
[51] Int. Cl. ............................................. A47j 27/62
[50] Field of Search ........................................... 116/114;
198/135; 134/72, 58; 126/41; 94/327, 332, 339,
335, 326, 331, 389, 390, 391, 392, 393, 443, 386,
387, 107; 107/57

[56] References Cited
UNITED STATES PATENTS

| 1,010,169 | 11/1911 | Norbeck | 99/390 X |
|---|---|---|---|
| 1,171,122 | 2/1916 | Hill | 99/386 |
| 1,615,356 | 1/1927 | Bellamy | 126/41 |
| 3,267,924 | 8/1966 | Payne | 126/41 |
| 784,854 | 3/1905 | Grace | 99/386 UX |
| 1,458,021 | 6/1923 | Bamford | 99/386 X |
| 2,109,079 | 2/1938 | Zeigler et al. | 99/386 X |
| 2,171,510 | 8/1939 | Stirgwolt | 99/327 |
| 2,182,229 | 12/1939 | Hamel | 198/135 X |
| 2,352,447 | 6/1944 | Powers et al. | 99/386 |
| 3,203,435 | 8/1965 | Kurtz | 134/58 |
| 3,448,678 | 6/1969 | Burstein | 99/386 |
| 3,456,578 | 7/1969 | Pinsly | 99/386 |

*Primary Examiner*—Billy J. Wilhite
*Attorney*—Charles B. Haverstock

ABSTRACT: A device for quickly and uniformly cooking food products and especially meat patties including those in an initially frozen state without substantial loss of the flavor or juices of the products, said device having opposed burners positioned and oriented to simultaneously apply flame against opposite sides of the products or patties so as to cook them generally from their centers outwardly to their edges, and means for supporting and positioning the products between the opposed burners for a predetermined time to cook the products to a desired final edible condition.

INVENTORS:
DONALD E. STRAUB
HENRY F. REITZ
ALBERT A. YANKO
GEORGE B. HOFFMANN
BY Charles B. Haverstock
ATTORNEY.

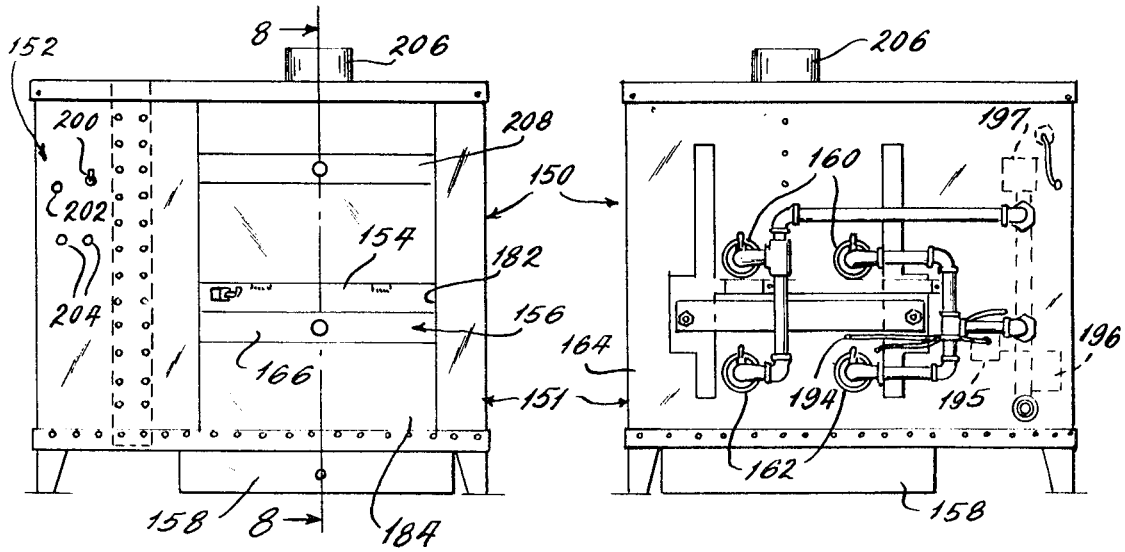
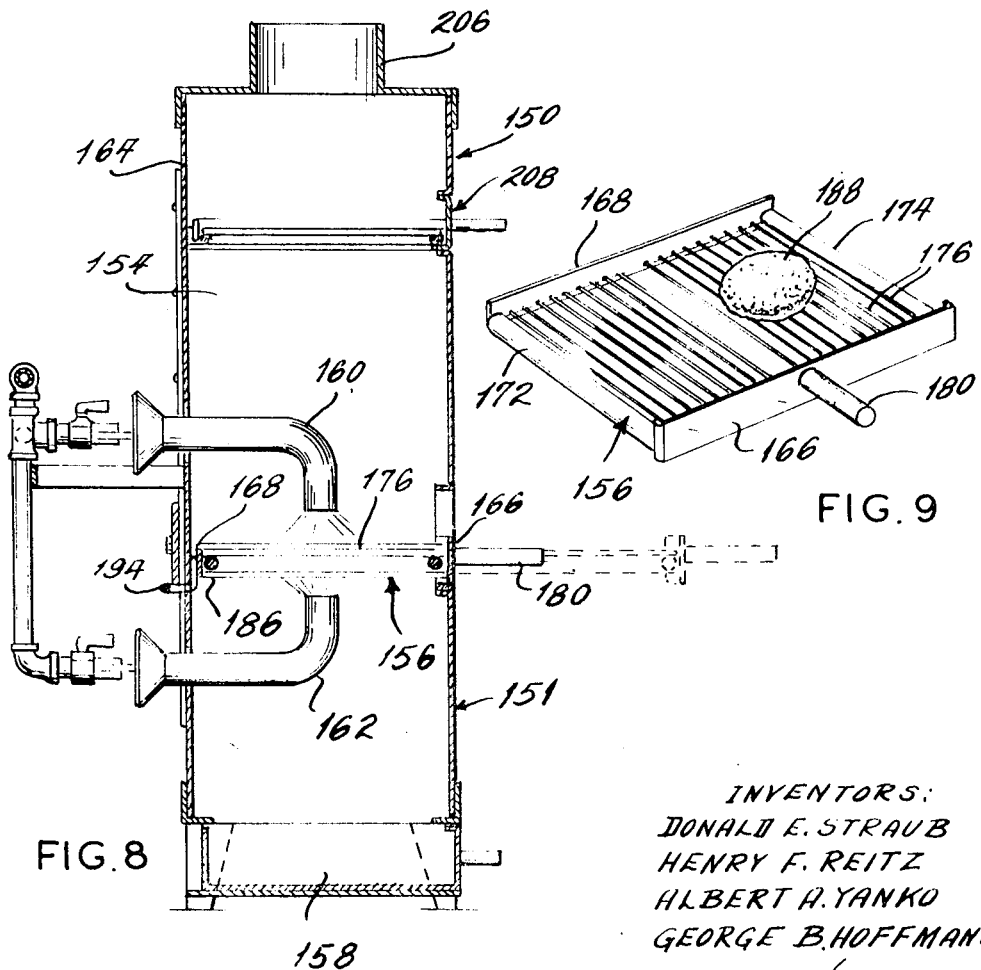

COOKING DEVICE AND THE LIKE

Many cooking devices including meat cooking devices are known and available commercially. For the most part, however, the known devices are relatively slow cooking, they are messy and difficult to clean and maintain, and they allow a substantial amount of the flavor and juices of the product or meat being cooked to escape and be lost. Furthermore, there is no known cooking device that is able to quickly and uniformly cook hard frozen products such as hard frozen hamburgers. For these and other reasons, known food cookers are unsuitable or undesirable for many applications including particularly applications in restaurants and other eating establishments that specialize in hamburgers and other products that must be prepared to a delicious and edible condition in a relatively short time such as in a matter of seconds. It is also important in such establishments to be able to do the cooking with a minimum of operator attention and labor and to be able to do the cooking as automatically as possible so that the employees can spend most of their time taking and filling orders. It is also highly desirable to be able to control and regulate the quantity and flow of cooked products to meet the demand while at the same time maintaining the cooking means in a clean and sanitary condition. The present means are constructed to fulfill these and other requirements and at the same time to be easily and expeditiously disassembled for cleaning and maintenance purposes with a minimum of effort and downtime.

Known cooking devices such as gas cooking devices that utilize open flames which are applied to the product being cooked generally apply the flames in direct contact with one side of the product at a time. This tends to soften the product particularly if the product is in a hard frozen condition to start with and results in loss of some of the flavor and juices during cooking and may also result in substantial grease splatter. Also known devices that move the product relative to the heat source or flame during cooking have disadvantages including requiring some form of lubrication means or the like and are built to be used with special grades of product which are not always the most economical and/or flavorful. This is done, among other reasons, to keep the product from sticking to the means that supports it during cooking. Often the products stick anyway and this makes them difficult to turn over and remove after cooking and also does not lend itself to use with automated equipment. Sticking of the product also results in waste and increases the amount of maintenance and cleaning required to maintain the cooking device. Known cooking devices that have means for moving the products past a cooking station usually also move the products at a relatively uniform constant rate so that the flame or other heating means will cook certain portions of the products more than other portions and results in nonuniformly cooked products. Products such as hamburgers and the like when cooked automatically in such devices therefore end up with burnt edges and with one side more cooked than the other and the products may also lose some of their flavor in the process. These conditions are aggravated in known cooking devices when cooking hard frozen products.

The present cooker overcomes these and other disadvantages and shortcomings of the prior art devices by teaching the construction and operation of a cooking device which can be made to be fully or partly automatic, which is adaptable to high as well as low volume operations, is fast cooking, easy to operate and maintain and is capable of producing consistently uniformly cooked products of a quality superior to those cooked by any known means. To accomplish this the present device includes spaced opposed burners which are positioned to simultaneously direct their flames against opposite sides of the meat or other product being cooked. The present device also includes means to accurately and predeterminately position the product being cooked between the spaced burners and optional means to automatically control the length of time that the product is in the cooking position. The utilization of opposed flames impinging simultaneously on the product from opposite sides also quickly sears the product on all sides and this helps to seal in the juices and flavor and reduces grease splatter and mess incident to the cooking operation.

A principal object of the present invention therefore is to provide improved means for cooking food products.

Another object is to substantially reduce the time required to cook food products such as hamburgers and the like.

Another object is to provide means for quickly cooking products such as meat products with a minimum loss of the natural flavor and juices.

Another object is to provide means to more uniformly cook products such as hamburgers and the like.

Another object is to provide means for more quickly and uniformly cooking frozen products such as hard frozen meat products.

Another object is to provide a cooking device which is particularly well adapted for use in restaurants and other eating establishments where the demand as well as fluctuations in the demand may vary considerably.

Another object is to provide relatively inexpensive yet highly efficient cooking means which can be made to be operated automatically as well as manually.

Another object is to provide cooking means which require little or no warmup time.

Another object is to provide means for reducing the mess including the grease splatter normally associated with cooking devices especially those used for cooking meat products.

Another object is to provide a cooking device that is versatile enough to be used in large as well as in small size eating establishments and which can be operated by persons having little or no special skill and training.

Another object is to be able to cook meat and other products with a minimum of labor.

Another object is to provide cooking means which are adaptable for use in coin operated devices.

Another object is to provide cooking means which are relatively easy to clean and maintain.

Another object is to provide automatic cooking means which are easily and quickly adjustable to cook different sizes and shapes of products to different degrees of doneness.

Another object is to reduce the amount of fuel required to cook a given product.

Another object is to provide improved conveyor means for use in cooking devices and the like.

These and other objects and advantages of the present invention will become apparent after considering the following detailed specifications which discloses several embodiments thereof in conjunction with the accompanying drawings, wherein:

FIG. 5 is an enlarged fragmentary perspective view of a portion of a belt employed in the present device;

FIG. 6 is a front elevational view showing another embodiment of the present cooking device;

FIG. 7 is a back elevational view of the device of FIG. 6;

FIG. 8 is an enlarged cross-sectional view taken on line 8—8 of FIG. 6; and,

FIG. 9 is a perspective view of the product tray employed in the device of FIG. 6.

Figure 1:
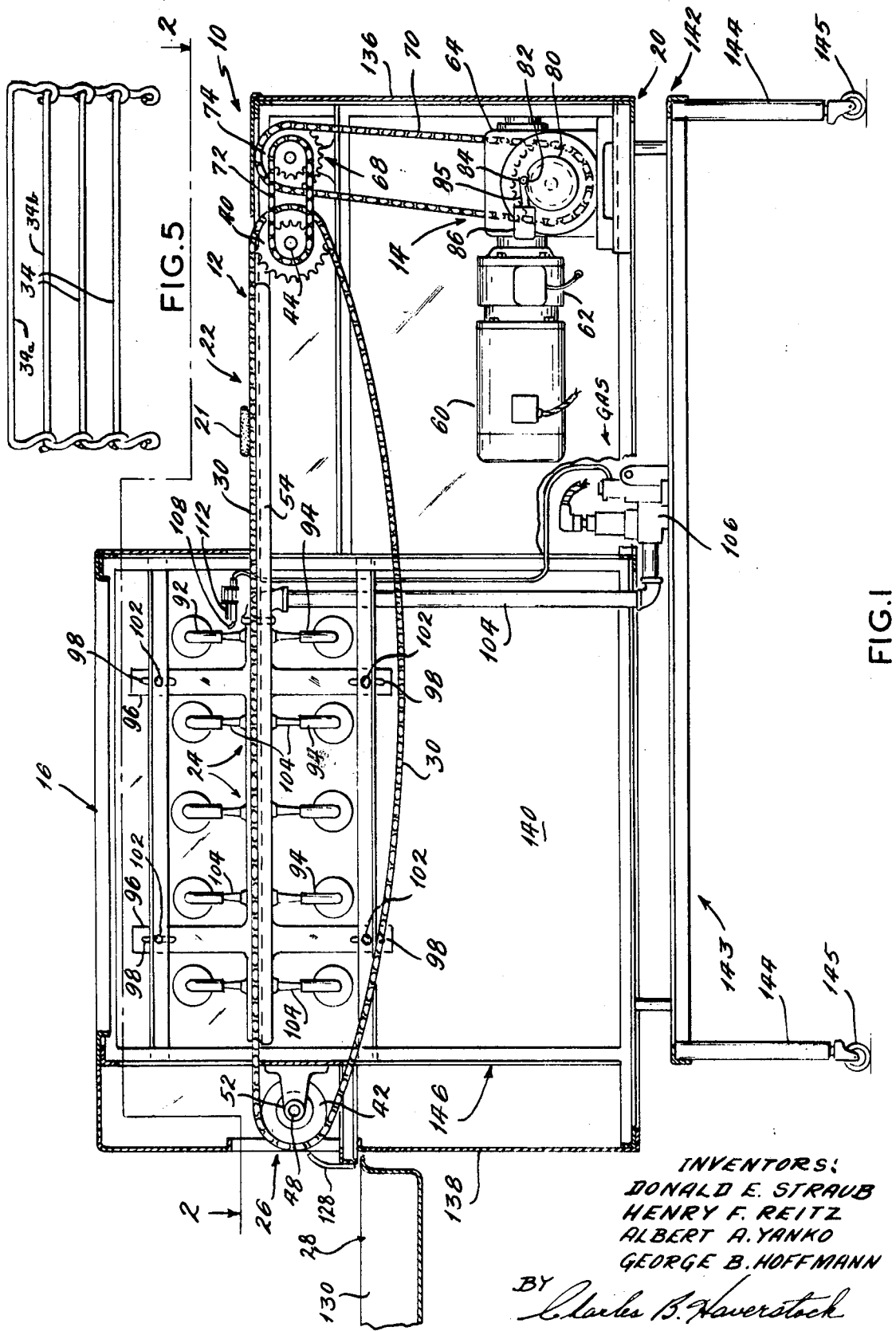
FIG. 1 is a cross-sectional elevational view taken through the center of a cooking device constructed according to the present invention.

Referring to the drawings more particularly by reference numbers, number 10 in FIG. 1 refers generally to a cooking device constructed according to the present invention. The device 10 includes product conveyor means 12, conveyor drive means 14, a cooking portion 16, and control means 18

(FIG. 2) for the device including the controls mounted on the housing means 20 for the subject device. Food products such as hamburger patties 21 are placed on the conveyor means 12 and conveyed thereby from a loading station 22 to and past one or more cooking stations 24 of which there are five shown located in the cooking portion 16 in FIGS. 1 and 2. After the product has passed the final cooking station 24 it moves to an unloading station 26 where it is removed from the conveyor means 12 and allowed to fall into suitable container means 28 provided to receive and accumulate the products as they are cooked. The time required to cook each product is the total time it spends at the several cooking stations 24 and is an adjustable time which can be adjusted by the control means 18 which include timer means that will be described later. The selection of the cooking time depends on many things such as the type of product to be cooked, the product's size and shape, how well done the product is to be cooked, whether the product is in hard frozen or other condition when placed on the conveyor means 12, the number of cooking stations 24 provided, the intensity of the flames at the cooking station, and on other factors.

The conveyor means 12 in the device as shown include a pair of spaced endless flexible link type belts 30 and 32. The belt 30 is used to convey the products to be cooked such as meat patties, steaks, fish patties, hotdogs and the like, while the belt 32 is used to convey other types of products such as bread or bun products which are to be served with the meat product. The belts 30 and 32 are of similar endless construction and are constructed of a plurality of spaced rod members 34 which have interlocking end portions as clearly shown in FIG. 5. The belts are also constructed of a material such as stainless steel which is able to withstand extreme heat without adverse affect. The interlocking end portions of the rod members 34 which make up the belts 30 and 32 make the belts flexible and able to cooperatively engage drive means therefor, and the rod members 34 are spaced apart along the belt so that they form endless movable grid platforms for supporting the products. The construction of the belts is also such that the products positioned thereon are exposed over almost all of their surfaces which is important because of the way in which they are cooked. The belt rods 34 must be spaced close enough, however, to assure that the product is sufficiently supported and will not fall through and be lost or wasted.

The belts 30 and 32 are supported by and travel about spaced driving sprockets 40 positioned adjacent to the input end of the loading station 22 and idler rollers or idler sprockets 42 located adjacent to the unloading station 26. The driving sprockets 40 for both belts 30 and 32 are shown mounted on a common drive shaft 44 which is supported by bearing means 46 attached to the frame or housing structure 20. In like manner, the idler rollers 42 are mounted on another shaft 48 also supported by associated bearing means 52. The upper reaches of the belts 30 and 32 between the sprockets 40 and 42 are supported for sliding movement on track members 54 which extend substantially the full length of the machine. The belts therefore move along the members 54 between the loading to the unloading stations 22 and 26 respectively, and through the cooking chamber 16. The track members 54 therefore guide and support the upper reaches of the belts 30 and 32 and cause them to follow horizontal paths through the cooking portion 16.

The lower portions of the belts 30 and 32 are allowed to hang relatively loosely between the sprockets 40 and 42 as clearly shown in FIG. 1, and the weight of the belts 30 and 32 is sufficient to maintain their upper reaches in a relatively taut condition which is desirable to the operation. The looseness of the belts 30 and 32 also provides for expansion and/or contraction of the belts, and the belts may be constructed to have the connections between certain adjacent links such as between the links 34a and 34b (FIG. 5) relatively easily releasable so that the belts can be removed from their sprockets 40 and 42 for periodic cleaning when necessary.

The belts 30 and 32 are driven by the conveyor drive means 14 which include, among other things, a drive motor 60, an associated electromechanical clutch-brake device 62 and a speed reducer 64. The motor 60 drives the clutch-brake device 62 which is constructed and operated either to transmit the rotational motion of the motor to the speed reducer 64 or to decouple and stop the speed reducer 64 on signal from the control means 18. The speed reducer 64 is in turn coupled to the driving sprockets 40 by a drive train assembly 68 (FIG. 1) which includes link chains 70 and 72 and a sprocket member 74. Therefore when the speed reducer 64 is coupled to the motor 60 through the clutch-brake device 62 power will be supplied to move belts 30 and 32. The speed of movement of the belts is determined by the speed of the motor and the gear ratios of the drive components that couple the motor thereto.

The signals that are provided to energize the clutch-brake 62 are controlled by a cam member 80 which is connected to rotate with the output of the speed reducer 64. The cam 80 is shown in FIG. 1 as being nearly round in shape and is provided with an indented portion 82. A cam follower 84 rides on the surface of the cam 80 and once each rotation thereof falls into the indented portion 82 and in so doing allows a switch operating arm 85 on a switch 86 to move to a position closing the contacts of the switch 86. When the contacts of the switch 86 close a delay timer device 88 mounted on the housing 20 is energized. The timer 88 may be a conventional timer device and includes means which time and control a signal which is used to energize the clutch-brake 62. When the timer 88 is energized by the closing of the switch 86, it causes the clutch-brake 62 to decouple the motor 60 from the speed reducer 64 and at the same time to thereby provide a braking action to stop the conveyor belts 30 and 32. The belts will then remain stationary for a predetermined time as determined by the setting of a timer control knob 90 which is part of the timer 88. This stopped condition persists even though the motor 60 continues to be energized. After the selected delay time has taken place the timer 88 will operate to reenergize the clutch of the clutch-brake 62 thereby releasing the brake action and again causing the belts to move. Each time the clutch is reengaged the belts will move a predetermined distance as determined by one complete rotation of the cam 80. The timer 88 can therefore be adjusted to provide almost any variation in time between succeeding movements of the belts and this in turn regulates the cooking time which is the total of the time that the products on the belt remain at the various cooking stations 24 as will be described. The distance the belts travel during each movement thereof is also controlled by the various gear ratios including the gear ratio of the speed ratio of the speed reducer 64 and the gear ratio of the drive train assembly 68.

The belt travel is usually factory preset to be the same as the spacing between the adjacent cooking stations 24 in the cooking portion 16 or multiples thereof. It should be obvious that many other intermittent drive means could also be used in the present device without departing from the basic idea of moving a product from station-to-station. These include devices such as well-known Geneva movements, ratchet and pawl devices, and others. The cam and clutch means disclosed, however, are probably more versatile for the present purposes since the time that a product remains in a fixed position is independent of the speed at which the product is moved. There are also advantages in having a construction such as disclosed in which the motor operates continuously although intermittent motor operation can also be used to achieve intermittent movement as well.

Figure 3:
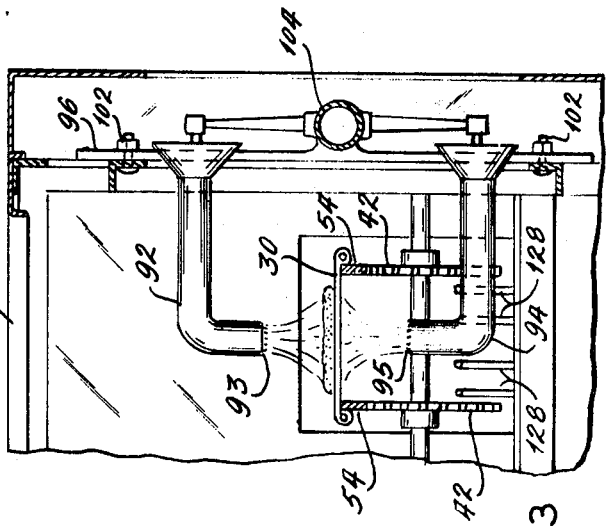
FIG. 3 is an enlarged fragmentary cross-sectional view taken on line 3—3 of FIG. 2.
Figure 4:
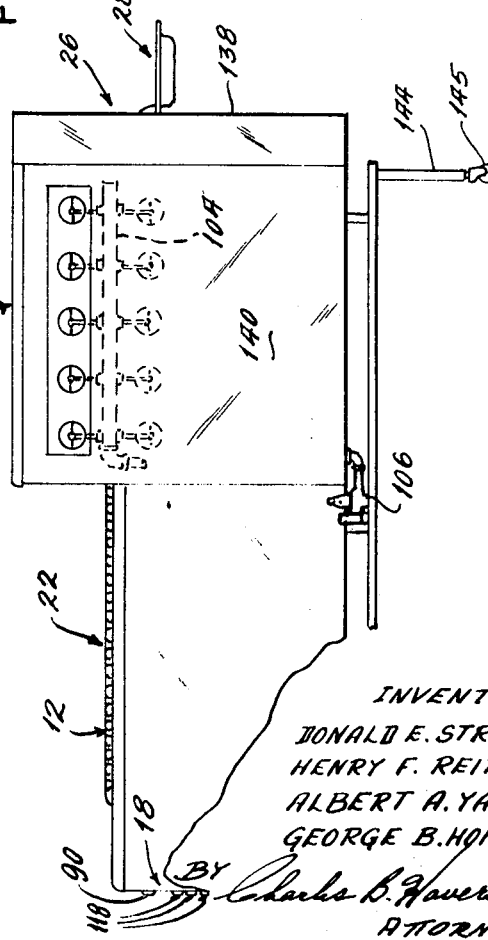
FIG. 4 is an elevational view showing the back side of the present device.

The structure and operation of the cooking means employed in the present device are important to the invention and represent a substantial departure from known forms of cooking means. In the present device, one or more cooking stations 24 are provided and each station includes a pair of opposed gas burners 92 and 94 such as are disclosed in detail in FIG. 3. The burner 92 which is shown as the upper burner at each station is an L-shaped tube member with its outlet or burner end 93 positioned so that flame emitted therefrom is directed downwardly. The other burner 94 which is shown as the lower burner at each station also includes an L-shaped tube member with its outlet or burner end 95 positioned so that the flame emitted therefrom is directed upwardly. The upwardly and downwardly directed flames at each station are located so that they are in alignment and oppose one another and they are also located so that they impinge against opposite sides of a product to be cooked when the product is on the belt 30 and is located at one of the cooking stations. Where the burners 92 and 94 are vertically oriented as will usually be the case, it may also be desirable to have the upper burner slightly closer to the product than the lower burner to compensate for the normal convective forces and to equalize the heat applied to both sides of the product.

The burners 92 and 94 are attached to a support member 96 which is part of the frame structure 20. This attachment should preferably be such as to allow some vertical adjustment of the burners so that they can be used to cook different kinds and thicknesses of products if desired. In the form of the device shown in FIG. 1 the vertical adjustment means include vertical slots 98 in the support member 96 through which fastener means such as nuts and bolts 102 extend, and in this embodiment all of the stations are made to be adjustable simultaneously.

When more than one cooking station is provided as in the construction shown in FIGS. 1—4, the same horizontal distance is maintained between the adjacent stations 24 so that the intermittent movements of the belts 30 and 32 will accurately advance the products from station-to-station during a cooking operation. The capacity of such a device can also be increased by increasing the number of cooking stations and correspondingly reducing the cooking time at each station thereby allowing more frequent intermittent movement of the belts 30 and 32 and more frequent deposit of cooked products at the output.

The burners 92 and 94 are connected to a source of gas fuel by conduit means 104 which include a solenoid control valve 106. The valve 106 may be similar to the gas valves used on furnaces and like devices, and the gas supply means may also be provided with pilot light means 108 and temperature sensing or thermostat means 112 positioned in the cooking chamber adjacent to one or more of the burners. The solenoid valve 106 controls the supply of fuel to the burners and preferably includes a usual type of safety means to prevent the gas from being turned on when the pilot 108 is out. Pilots and valves of this general type are well known and available commercially and are not part of this invention.

Referring again to FIG. 2, a steamer device 114 is optionally shown attached to the housing 20 inside the cooking portion 16 at a location beneath the belt 32. The steamer 114 is provided to precondition the auxiliary products such as the bread products or bun products on the belt 32 that are to be warmed or toasted. Also inside the cooking portion 16 at a location above the belt 32 is a radiant heater device 116 which may include heater means 116a and reflector means 117 to heat and toast the bread products as they move by underneath. There are many types of radiant heater devices that can be used for this purpose including those which use gas which are probably the most economical in this case.

Figure 2:
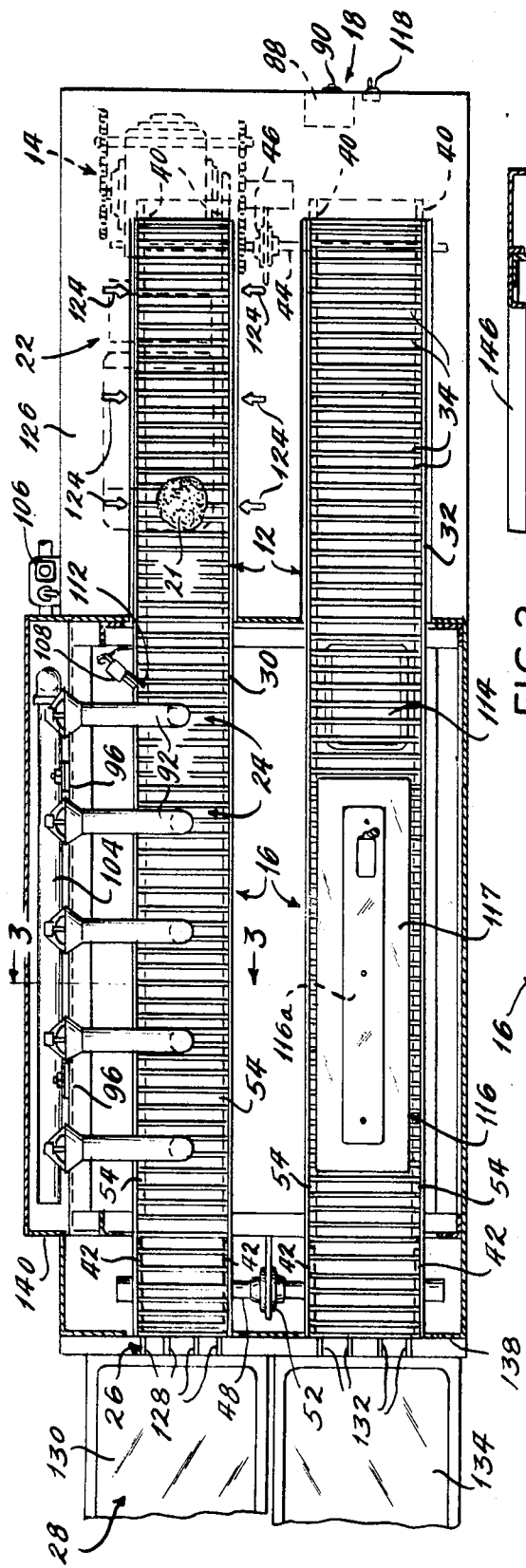
FIG. 2 is a cross-sectional view taken on line 2—2 of FIG. 1.

To operate the device 10 control switch means 118 are turned on and close circuits which energize the control means 18, the motor 60, the steamer 114 and the radiant heater 116. The switch means also energize and open the solenoid valve 106 to supply gas to the burners at the various cooking stations. Once the switches 118 are turned on, food products such as meat patties, steaks, fish patties, hotdogs and many other products as well can be placed on the belt 30 when the belt is not moving at positions marked by suitable indicator means such as the stationary pointers 124 on panel 126 (FIG. 2). This is so that the products will thereafter be aligned with the burners at each of the cooking stations. The loading station 22 should also be long enough to provide space for placing more than one product on the belt 30 at a time and if desired means can be provided to place the products on the belt 30 automatically. At the same time, bread products or buns are placed on the belt 32 although in this case it is not necessary that they be as accurately located since they do not move between spaced sets of opposed burners as in the case of the meat products but merely move above the steamer 114 and beneath the heater 116.

Each product as it cycles through the cooking portion 16 remains at each of the cooking stations 24 a time predetermined by the setting of the timer control knob 90 as aforesaid. Also at each cooking station 24 the product thereat is positioned between the opposed flames which are directed toward the center of opposite sides of the product so the most intense heat is applied at the center of opposite sides of the product and works its way outwardly toward the edges thereof. This is an important feature of the subject device and is one of the main reasons why products can be cooked so quickly and yet uniformly without burning any portion thereof even in cases where the products are placed on the belt in an initially hard frozen condition. Exposing the products directly to the flames also initially and quickly sears the products and minimizes loss of the natural juices and flavors. After each product has cycled between each of the pairs of burners it reaches the unloading station 26 and is removed from the belt 30 as the belt moves over the rollers 42 by engagement of the product with fingers 128 which are attached to the housing 20. The fingers 128 are so located and positioned that they engage the products as they are moved by the belt 30 around the rollers 42, and the products are therefore partly separated by the bending of the belt and partly by engagement with the fingers 128. Thereafter, the products drop into the container means 28 and specifically into pan 130 provided therefor. Meanwhile, the bread or bun products pass through the cooking portion 16, are steamed and warmed or toasted, and are thereafter removed from the belt 32 by other fingers or deflectors 132 which are located similarly to the fingers 128. The buns then drop into another product pan 134.

As already stated, by proper adjustment the present device can be used to cook products other than meat patties or hamburgers. For example, if desired, hotdogs can be placed on the belt 30 at suitable locations and are usually oriented to be parallel to the belt rods 34. The hotdogs can be cycled through the cooking portion 16 similar to the way for hamburgers but perhaps on a different time schedule and in some cases it may be desired to position the hotdogs so that they do not remain positioned directly between the exposed flames. It is also contemplated to continuously move the belt when cooking products such as hotdogs which require less heat and less cooking time. This can be done with relatively minor modifications. It is also contemplated to place hotdogs on the belt 30 between hamburgers and other like products so that hamburgers and hotdogs cook simultaneously but under different conditions of exposure to the flames.

The housing structure 20 is preferably formed by a plurality of removable panels including panels 136, 138 and 140 as well as others, all of which are relatively easy to install and remove for cleaning and maintenance purposes. The panels are preferably provided with means that snap-on or slide into cooperating means on the frame structure indicated generally by number 142 to facilitate their installation and removal. The panels are also preferably made from a material such as stainless steel which is relatively strong and resistant to damage and corrosion. The frame 142 includes a lower frame portion 143 having legs 144 with casters 145 which make the device 10 relatively mobile and accessible, and the frame 142 also includes an upper portion 146 which is enclosed by the removable panels. The upper portion 146 particularly above the cooking means 16 is also preferably ducted by suitable means so that the products of combustion and smoke can escape.

The form of the device shown in FIGS. 1—4 is primarily for use in eating establishments that require means for rapidly and efficiently cooking products and in which the demand may vary widely from time to time. The device also requires relatively little skill or training to operate. It is important to note that the subject device requires no warmup period especially since the products are exposed to opposed open flames and this means that the fuel or gas supply, except for the pilot light, can be turned off whenever the device is not operating. The present device is also particularly suitable for cooking products from an initially hard frozen condition to a final edible condition in a total time that may be less than even 1 minute. This is important because it means that a supply of uncooked products can be maintained indefinitely in a hard frozen condition thereby preventing waste and also enabling the proprietors of relatively small eating establishments to be able to buy in large quantities thereby taking advantage of quantity discounts. The fact that the present device requires no warmup time also contributes to its economy by enabling the operator to shut the machine off when it is not in use and yet enables him to make it fully operative by the flick of a switch. This represents a substantial savings not only in fuel but also in electric power. These advantages coupled with the improved cooking capability which is due in large measure to the fact that the products are exposed over their entire outer surfaces to flame during cooking are all important features.

FIGS. 6, 7, 8 and 9 show a modified and somewhat simplified embodiment 150 of the present device which is primarily for use in small eating establishments where the demand is limited. It can also be used to satisfy the overflow requirements in larger establishments. The modified device 150 has many of the same desirable features as the device 10 but is designed more for manual than for automatic operations. The device 150 includes a housing 151 having a control panel portion 152, a cooking chamber 154, removable product support or grill means 156 and a lower housing chamber portion 158 where drippings and wastes may collect. As shown in FIG. 7 the device 150 has two cooking positions each including a pair of vertically spaced opposed burners 160 and 162 which extend forwardly in the cooking chamber 154 form a supporting backwall 164. The burners 160 and 162 are similar to the burners in the device 10 and are connected to a source of gas or similar fuel through associated conduit and solenoid valve means.

The grill means 156 are shown in detail in FIG. 9 and include spaced front and rear walls 166 and 168 respectively and spaced connected sidewalls or side rods 172 and 174 which also act as slides when inserting and removing the grill means from the housing. The grill also has a plurality of spaced rods 176 which extend between the walls 166 and 168 on which a product such as a hamburger is supported during cooking. A forwardly extending handle 180 is attached to the grill adjacent to the front wall 166 for use in inserting and removing it from the housing 151. The housing 151 has an opening 182 located in its front wall 184 into which the grill 156 is inserted. The grill 156 is supported and guided during insertion and withdrawn from the housing 151 by suitable horizontal guides or channels 186 which slideably cooperate with the rods 172 and 174 on the grill. A hamburger 188 is shown in FIG. 9 positioned on the grill in one of its two cooking positions. The grill may optionally include means to indicate to the operator where to place the product to properly locate it during cooking although this usually becomes obvious shortly after the device is placed in operation. This can also be done by intentionally omitting one of the grill rods at a location equidistant between two adjacent cooking positions as shown.

A spring-loaded switch operator member 194 is located adjacent to the rear wall of the device 150 in position to be bumped and activated by insertion of the grill 156 into its cooking position in the housing 151. When the actuator 194 is bumped it closes the contacts of an associated switch 195 which then operates to energize solenoid valve means 196 in the fuel line to supply fuel to the burners 160 and 162 as in the case of the device in FIGS. 1-4. Actuation of the switch 195 also energizes timer means 197 which are located behind the control panel 152. The timer means then control the length of time the burners will remain on and when the time is over the burners will be turned off automatically. The burners will not then be able to be relighted until the grill is removed and reinserted. The timer means 197 can be set to any desired cooking time depending on the product and how well it is to be cooked. When cooking hamburgers and like products it has been found that the total cooking time required even when the products are hard frozen to begin with is frequently less than 1 minute.

A master control switch 200 is included on the control panel 152 and must be closed before the time means and the solenoid valve can be operated. As an optional feature a separate solenoid valve can be provided to control each pair of burners so that fuel is not wasted when only one cooking station is being used. The device can also be made to have one or any number of cooking stations and individual grills can be provided for each without changing the nature of the invention. If a solenoid valve is provided for each cooking station the master switch 200 may also be modified to have multiple positions so that the various possible operating conditions can be achieved. In addition, an indicator light 202 may optionally be provided to alert the operator that the master switch 200 is on, and if desired, other indicator lights 204 can be provided to indicate which of the burners are on, and/or when they turn off indicating a product is done.

An exhaust duct 206 to carry away the smoke and other products of combustion is connected to the top wall of the housing 151 while the heavier waste products and drippings fall into the lower part of the housing which is preferably constructed to be easily removable for cleaning and maintenance purposes. It is anticipated, however, that there will be a minimum of waste and grease accumulation because of the fact that the products are exposed over their entire surfaces to open flames which initially operates to sear the product and to seal in the juices and flavor while thereafter the product is cooked to its desirably final edible condition. So far as known, it has not heretofore been contemplated to cook in this way using two opposed open flames directed against a product from opposite sides as taught by the present invention. This also improves the uniformity of the cooked products.

The device 150 may have a second removable grill or tray 208 located in the housing 151 above the cooking position as shown in FIGS. 6 and 8. The second grill 208 is used for warming bread products such as buns and in this case the heat that rises from the cooking station is used for this purpose.

Thus there has been shown and described novel cooking means particularly suitable for use in quick order eating establishments and the like where food must be cooked rapidly and as needed, which means fulfill all of the objects and advantages sought therefor. Many changes, alterations, modifications and other uses and applications of the subject cooking means will, however, become apparent to those skilled in the art after considering this specification and the accompanying drawings which discloses several embodiments thereof. All such changes, alterations, modifications, and other uses and applications which do not depart from the spirit and scope of the invention are deemed to be covered by the invention which is limited only by the claims which follow.

What is claimed is:

1. Means for cooking food products comprising means forming a cooking chamber, a pair of flame producing burners positioned in spaced opposed relationship such that the flames produced thereby are directed toward each other in said chamber, a source of fuel including means connecting said fuel source to supply fuel to the burners, each of said burners including an open ended burner member capable of producing a single outlet gas flame, the flames from said opposed burners if uninterrupted by a food product therebetween coming in contact with each other, means including a substantial open grid structure for positioning and supporting a product to be cooked in cooking position in the space between the burners such that the said flames simultaneously contact opposite sides of the product and are deflected sufficiently to envelope the product being cooked in the flames, said flames heating and cooking the product positioned therebetween, the most intense heating and cooking taking place at the locations where the flames most directly impinge thereon, and means for controlling the length of time the product remains in said cooking position.

2. Means for cooking food products and especially meat patties and the like comprising a housing including in order a loading station, a cooking station and an unloading station, an endless flexible and substantially open grid type belt for supporting products to be cooked, said belt extending through the cooking station between the loading and unloading stations and said belt being constructed of a plurality of hingedly connected together members such that a product positioned thereon is exposed over substantially all surfaces thereof, intermittent drive means operatively connected to the belt for moving said belt as spaced time intervals a predetermined distance such that products positioned thereon at the loading station advance through the cooking station to the unloading station, and means in the cooking station including at least one pair of spaced heating elements, each element of which directs an open flame against an opposite side of the belt and against an opposite side of a product to be cooked positioned on the belt for simultaneously cooking the product from both sides when products are moved therebetween by the movement of the belt.

3. The cooking means defined in claim 1 including means to move the grid structure between a loading position outside the cooking chamber and the cooking position.

4. The cooking means defined in claim 1, wherein said grid structure includes an endless flexible belt, means for moving said belt with the product positioned thereon between said spaced opposed burners, and means for controlling the time that the product remains between said opposed burners during said movement.

5. The cooking means defined in claim 4 including intermittent drive means for moving said endless belt, said time control means controlling the length of time the belt stops between succeeding intermittent movements thereof, said intermittent drive means controlling the position where the belt stops on succeeding movements thereof to control the cooking position of the product thereon.

6. The cooking means defined in claim 1 wherein a plurality of spaced sets of said pairs of opposed burners are positioned in said cooking chamber at locations spaced along the grid structure.

7. The cooking means defined in claim 6 wherein said means for positioning and supporting the product to be cooked include an endless flexible grid structure having a portion thereof extending between all of the sets of spaced burners in the cooking chamber, and means for intermittently moving the grid structure a distance equal to at least the distance between adjacent pairs of spaced burners.

8. The cooking means of claim 7 including a grid structure loading station adjacent the cooking chamber and indicator means for indicating the location where products are to be placed on the grid structure to be in proper cooking position when moved by the grid structure into the cooking chamber.

9. Means for cooking food products including those in an initial frozen state comprising a housing having a cooking chamber therein, burner means including at least one pair of spaced burners each burner of which is capable of emitting a single gas flame therefrom, said burners being positioned in the cooking chamber in opposed relationship so that the flames emitting therefrom are directed toward and into contact with each other when not interrupted by an object therebetween to produce an enlarged region of flame where the flames come into contact, means for feeding fuel to the burners to maintain the flames during cooking operations, product support means including a substantially open grid structure for supporting a product thereon during cooking, means for moving the product support means including the grid structure and the product supported thereon into the space between the opposed burners such that the product is exposed simultaneously on opposite sides directly to the open flames emitting from both of said spaced opposed burners of said pair, the flames being further distorted by contact with the product to substantially envelope the product in the flame, the heat from the flames being most intense where they are directed from the burners at the product so that the product will cook more intensely at the locations where the flames most directly impinge working outwardly therefrom to the product edges, and means for controlling the time that the product remains exposed and enveloped by the flames.

10. The means defined in claim 9 wherein said means for controlling the time include means for extinguishing the burner flames after a predetermined cooking time.

11. The means defined in claim 9 wherein said grid structure includes a belt and means for moving said belt, said means for controlling the time the product remains exposed to the opposed flames including means for periodically moving the belt and the product thereon relative to said flames.

12. The means defined in claim 11 wherein said burner means include a plurality of sets of said pairs of opposed burners, said sets being spaced along a portion of the belt in the cooking chamber, said means for periodically moving the belt includes means for moving the belt a distance equal to the distance between selected sets of exposed burners.

13. The means defined in claim 11 including means forming product loading and unloading stations, said stations being located respectively on opposite sides of the cooking chamber, said belt extending between said loading and unloading stations through the cooking chamber.

14. The means defined in claim 13 wherein said unloading station includes means for automatically removing products from the belt during movements thereof.